United States Patent
Khojastepour et al.

(10) Patent No.: US 8,254,859 B2
(45) Date of Patent: **\*Aug. 28, 2012**

(54) ENHANCING MIMO TRANSMISSION

(75) Inventors: Mohammad A. Khojastepour, North Brunswick, NJ (US); Narayan Prasad, Wyncote, PA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,521

(22) Filed: May 19, 2011

(65) Prior Publication Data

US 2011/0274207 A1   Nov. 10, 2011

Related U.S. Application Data

(62) Division of application No. 12/026,120, filed on Feb. 5, 2008, now Pat. No. 7,949,318.

(60) Provisional application No. 60/888,193, filed on Feb. 5, 2007.

(51) Int. Cl.
  *H04B 1/04* (2006.01)

(52) U.S. Cl. ............ 455/129; 455/102; 375/267
(58) Field of Classification Search ........ 455/101–102, 455/129; 375/267
See application file for complete search history.

(56) References Cited

U.S. PATENT DOCUMENTS 7,949,318 B2 *  5/2011  Prasad et al. ............. 455/129

* cited by examiner

*Primary Examiner* — Christian Hannon
(74) *Attorney, Agent, or Firm* — Akitaka Kimura; Joseph Kolodka

(57) ABSTRACT

A multi-rank beamforming (MRBF) scheme in which the downlink channel is estimated and an optimal precoding matrix to be used by the MRBF transmitter is determined accordingly. The optimal precoding matrix is selected from a codebook of matrices having a recursive structure which allows for efficient computation of the optimal precoding matrix and corresponding Signal to Interference and Noise Ratio (SINR). The codebook also enjoys a small storage footprint. Due to the computational efficiency and modest memory requirements, the optimal precoding determination can be made at user equipment (UE) and communicated to a transmitting base station over a limited uplink channel for implementation over the downlink channel.

10 Claims, 7 Drawing Sheets

ENHANCING MIMO TRANSMISSION

This application is a Division of U.S. patent application Ser. No. 12/026,120, filed Feb. 5, 2008, which in turn claims the benefit under 35 U.S.C. 119(e) of U.S. Provisional patent application Ser. No. 11/554,278, filed Oct. 30, 2006, and U.S. patent application Ser. No. 11/674,330, filed Feb. 13, 2007, the entire contents and file wrappers of which are hereby incorporated by reference for all purposes into this application.

FIELD OF THE INVENTION

The present invention relates to the field of wireless communications, particularly wireless, high-rate communications using multiple-antenna systems.

BACKGROUND INFORMATION

The hostility of the wireless fading environment and channel variation makes the design of high rate communication systems very challenging. To this end, multiple-antenna systems have been shown to be effective in fading environments by providing significant performance improvements and achievable data rates in comparison to single antenna systems. Wireless communication systems employing multiple antennas both at the transmitter and the receiver demonstrate tremendous potential to meet the spectral efficiency requirements for next generation wireless applications.

Moreover, multiple transmit and receive antennas have become an integral part of the standards of many wireless systems such as cellular systems and wireless LANs. In particular, the recent development of UMTS Terrestrial Radio Access Network (UTRAN) and Evolved-UTRA has raised the need for multiple antenna systems to reach higher user data rates and better quality of service, thereby resulting in an improved overall throughput and better coverage. A number of proposals have discussed and concluded the need for multiple antenna systems to achieve the target spectral efficiency, throughput, and reliability of EUTRA. While these proposals have considered different modes of operation applicable to different scenarios, a basic common factor among them, however, is a feedback strategy to control the transmission rate and possibly a variation in transmission strategy.

The performance gain achieved by multiple antenna system increases when the knowledge of the channel state information (CSI) at each end, either the receiver or transmitter, is increased. Although perfect CSI is desirable, practical systems are usually built only on estimating the CSI at the receiver, and possibly feeding back some representation of the CSI to the transmitter through a feedback link, usually of limited capacity. The transmitter uses the information fed back to adapt the transmission to the estimated channel conditions.

Various beamforming schemes have been proposed for the case of multiple transmit antennas and a single receive antenna, as well as for higher rank MIMO systems, referred to as multi-rank beamforming (MRBF) systems. In MRBF systems, independent streams are transmitted along different eigenmodes of the channel resulting in high transmission rates without the need for space-time coding.

In addition to performance considerations, it is also desirable to achieve the highest possible spectral efficiencies in MIMO systems with reasonable receiver and transmitter complexity. Though space-time coding is theoretically capable of delivering very high spectral efficiencies, e.g. hundreds of megabits per second, its implementation becomes increasingly prohibitive as the bandwidth of the system increases.

A need therefore exists for an MRBF scheme that is capable of high throughput yet which can be implemented with reasonable complexity.

SUMMARY OF THE INVENTION

The present invention is directed to quantized, multi-rank beamforming (MRBF) methods and apparatus, and in particular, methods and apparatus for precoding a signal transmitted in an MRBF system using an optimal precoder selected in accordance with a channel quality metric. In an exemplary embodiment, the precoded signal is transmitted in a high-speed downlink from a base station to user equipment (UE) and the channel quality metric includes a channel quality indicator (CQI) that is transmitted to the base station from the UE.

In an exemplary embodiment of the present invention, optimal precoder selection can be carried out with low computational cost and complexity using a precoding codebook having a nested structure which facilitates precoder selection. Moreover, the exemplary codebook requires less memory to store and yields better system throughput than those of other schemes.

In a further exemplary embodiment, Signal to Interference and Noise Ratio (SINR) information for one or more active downlink streams is used as a channel quality metric in selecting the optimal precoder.

The aforementioned and other features and aspects of the present invention are described in greater detail below.

DETAILED DESCRIPTION

Figure 1:
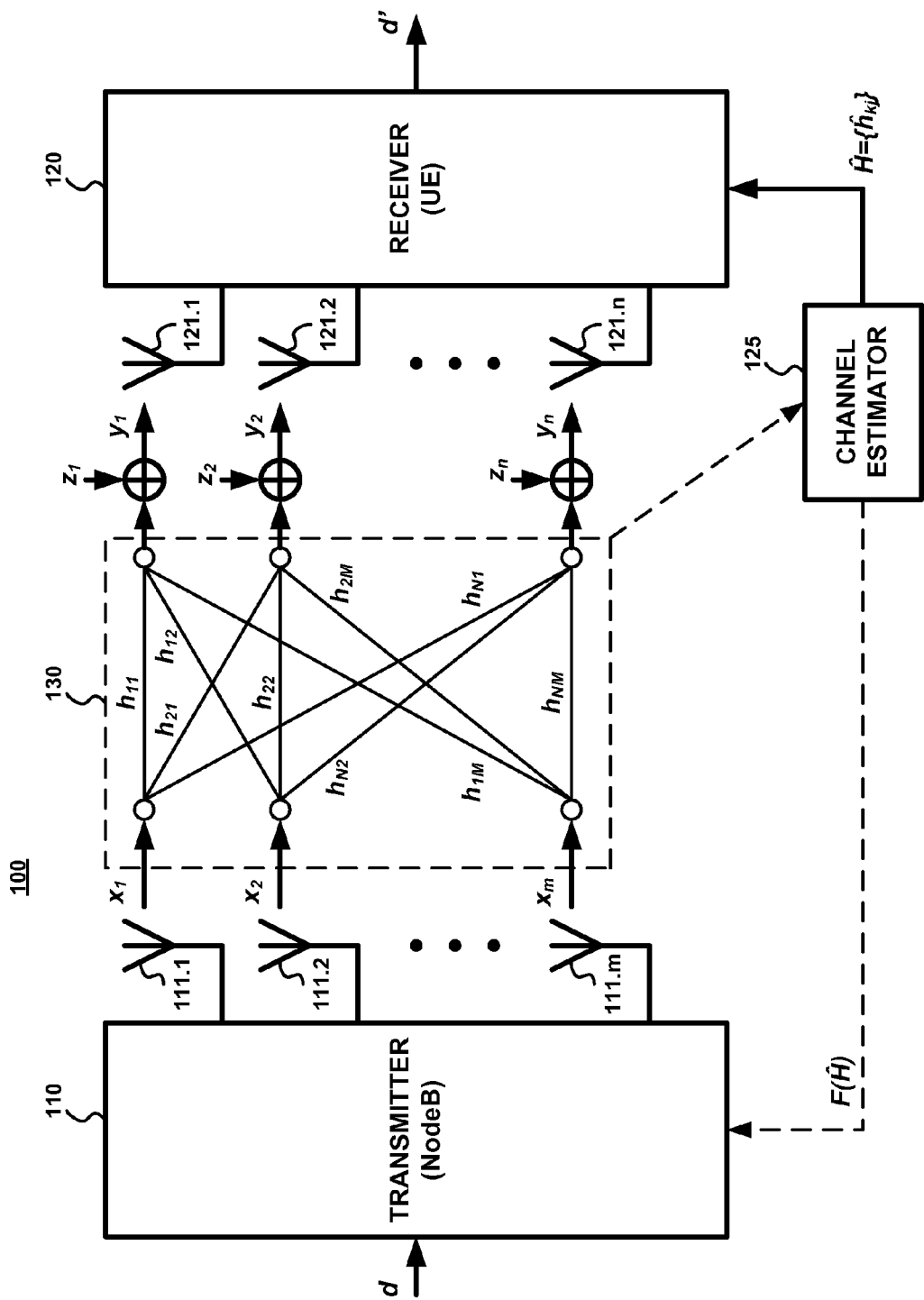
FIG. 1 is a schematic block diagram of a wireless multiple-antenna MIMO communications system with quantized feedback of channel state information.

An exemplary multiple-antenna communication system 100 with quantized feedback is schematically shown in FIG. 1. A transmitter 110, such as at a base station ("NodeB"), transmits from m transmitting antennas 111.1-111.m over a fading channel 130 to n receiving antennas 121.1-121.n coupled to a receiver 120, such as at user equipment (UE). The system 100 may be, for example, an orthogonal frequency-division multiplexing (OFDM) system, in which each of a plurality of orthogonal sub-carriers is modulated with a conventional modulation scheme, such as quadrature amplitude modulation (QAM), quadrature phase shift keying (QPSK), or the like.

The system 100 also incorporates an exemplary multi-rank beamforming (MRBF) scheme with precoding in accordance with the present invention. The transmitter 110 controls the transmitting antenna outputs in accordance with a set of precoding parameters, or a precoding matrix, which is selected based on an estimate of the channel 130 made at the receiver 120.

At receiver 120, a channel estimator 125 provides an estimate of the channel 130 to the receiver 120. One or more parameters determined as a function of the channel estimate are also provided from the receiver 120 to the transmitter 110 via a feedback channel. In an exemplary embodiment, such fed-back parameters may include a channel quality indicator (CQI) and the index of a recommended precoding matrix that the transmitter 110 should use based on the channel conditions. The determination of this information and its use by the transmitter are described in greater detail below.

For purposes of analysis, a flat fading channel model is assumed in which the channel remains constant for each block of transmission. For a multiple-antenna system with m transmit and n receive antennas the complex baseband channel model can be expressed as follows:

$$y = Hx + z, \quad (1)$$

where x is the m×1 vector of the transmitted signals, y is the n×1 vector of the received signals, H is an n×m matrix representing the channel, and $z \sim \mathcal{N}(0, N_0 I)$ is the noise vector at the receiver.

Figure 2:
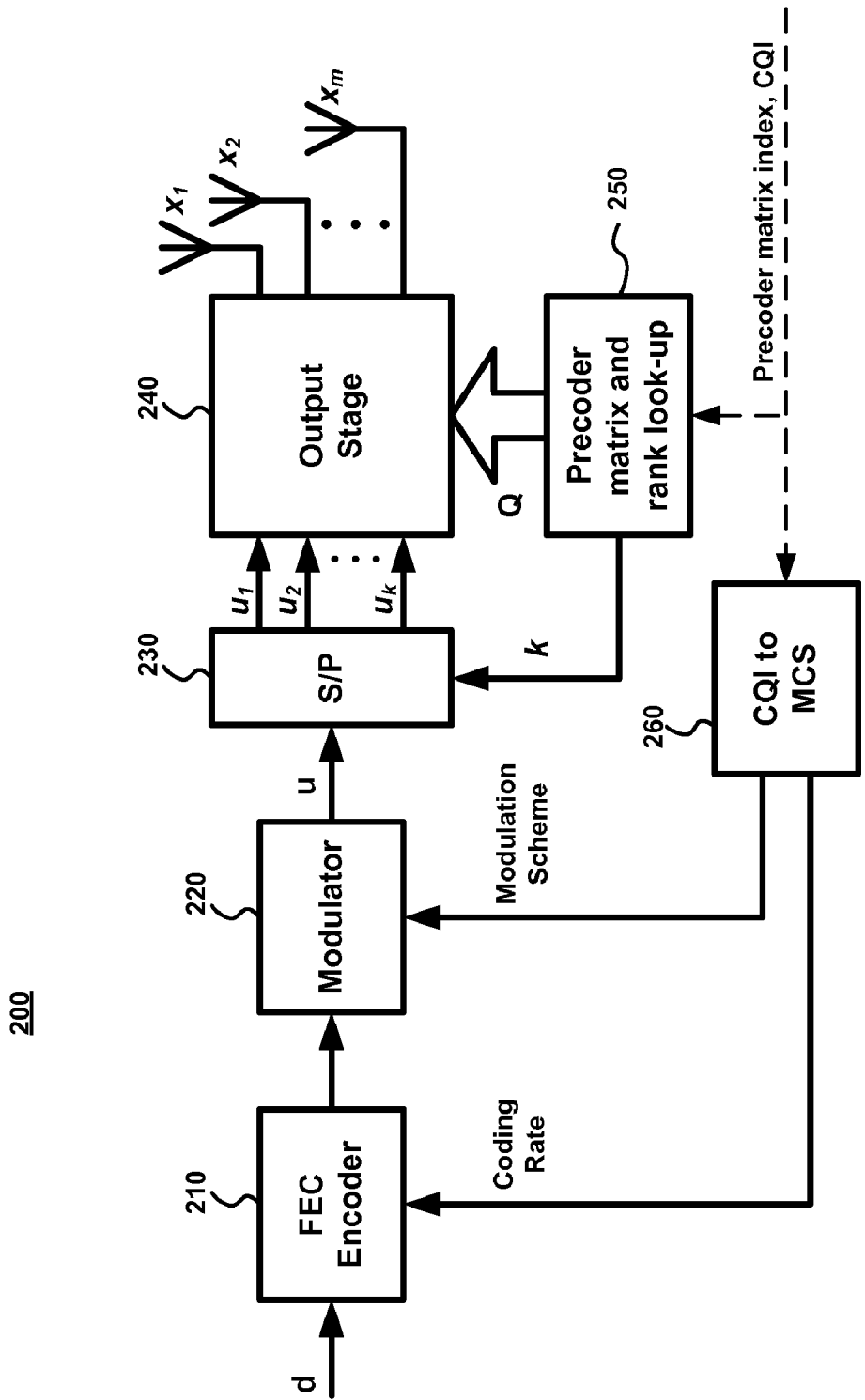
FIG. 2 is a block diagram of an exemplary embodiment of a transmitter in accordance with the present invention.

FIG. 2 shows a block diagram of a transmitter 200 which incorporates an exemplary precoding scheme in accordance with the present invention. A data stream d is first encoded by a forward error correction (FEC) block 210 and then modulated by a modulator 220 to generate modulated symbols u. The symbols u are provided to a serial-to-parallel converter (S/P) 240 which generates k streams of symbols that are to be simultaneously transmitted during the current symbol transmission interval. k is also referred to herein as the beamforming rank. At output stage 240, the symbol streams $u_1, u_2, \ldots u_k$, are subjected to pre-coding in accordance with an m×k precoder matrix Q, as follows:

$$x = Qu = \begin{bmatrix} u_1 \\ u_2 \\ \vdots \\ u_k \end{bmatrix} \quad (2)$$

The precoder matrix Q is chosen from a finite set of possible precoder matrices, Q, referred to as the precoding codebook. An exemplary precoding codebook with a successive, or nested, structure is described in greater detail below.

In the exemplary embodiment shown, the optimal precoder matrix is determined at the UE and an index representative thereof is fed-back to the nodeB transmitter 200. A look-up block 250 uses the index to look-up the corresponding precoder matrix Q and provides Q to the output stage 240 which carries out the operation expressed by Eq. 2 to drive the corresponding m antennas accordingly.

In addition to the precoder matrix index, the UE also feeds back the CQI metric to the nobeB transmitter 200. The CQI is used by a modulation and coding scheme (MCS) block 260 to determine an appropriate MCS corresponding to the value of the CQI that is fed back. The MCS information includes a coding rate for the FEC encoder 210 and a modulation scheme selection for the modulator. Exemplary coding rates may include, for example, 1:3, 1:2, 3:4, 1:1, etc., and exemplary modulation schemes may include QPSK, 16-QAM, 64-QAM, etc.

Figure 3:
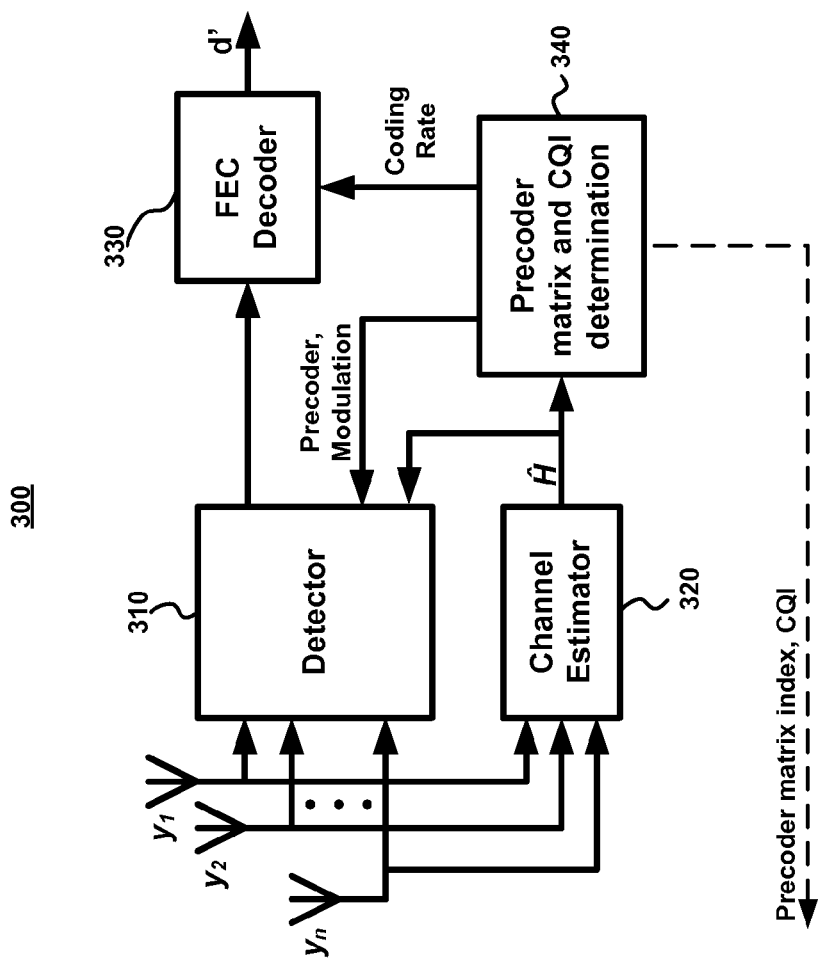
FIG. 3 is a block diagram of an exemplary embodiment of a receiver in accordance with the present invention.

FIG. 3 shows a block diagram of an exemplary embodiment of a receiver 300 for operation with the transmitter 200 of FIG. 2. The signals y received at the antennas of the receiver are provided to a detector 310 and a channel estimator 320. In a preferred embodiment, the detector 310 comprises a Linear Minimum Mean Squared Error (LMMSE) detector, although other detectors may be used. The detector 310 generates a stream of soft outputs or log likelihood ratios which are provided to a FEC decoder 330 which recovers the data stream d'. The channel estimator 320 provides an estimate of the channel to the detector 310 and to a precoder matrix and CQI block 340. As described in greater detail below, the block 340 uses the channel estimate to determine the optimal precoder matrix to be used given the current channel conditions as well as a corresponding value for the CQI metric. The index of the precoder matrix thus determined and the CQI are fed-back to the transmitter, which uses that information as described above. The block 340 also provides the precoder matrix and the modulation scheme selection to the detector 310 and determines a coding rate to be used by the FEC decoder 330. The modulation and the coding rate correspond to the CQI, which is fed-back to the transmitter. The transmitter uses the CQI to determine the same coding rate for the FEC encoder 210 and modulation scheme for the modulator 220 (see FIG. 2).

As mentioned above, an exemplary embodiment of an MRBF communications system in accordance with the present invention uses a precoding codebook with a successive, or nested, structure, which will now be described. Exemplary methods and apparatus for optimal CQI-metric-based precoder selection are also described below, as well as the corresponding Signal to Interference and Noise Ratio (SINR) computations and LMMSE filters that take advantage of the proposed precoding structure to reduce computational complexity.

Codebook

In an exemplary embodiment, a precoding codebook for use with a transmitter having M antennas comprises the following sets of unit norm vectors:

$$\{v_i^1 \epsilon C^M\}, \{v_i^2 \epsilon C^{M-1}\}, \ldots \{v_i^{M-1} \epsilon C^2\}, \quad (3)$$

where $C^N$ is the N-dimensional complex space and the first element of each vector is real. The corresponding M×M precoding matrices are formed using these vectors along with the unitary Householder matrix, $$HH(w) = I - 2\frac{ww^*}{\|w\|^2},$$

which is completely determined by the non-zero complex vector w. Further, let HH(0)=I. More specifically, the corresponding precoding matrices can be generated in accordance with the following expression:

$$A(v_{i_1}^1, v_{i_2}^2, v_{i_3}^3, \ldots) = \left[ v_{i_1}^1, HH(v_{i_1}^1 - e_1^M) \begin{bmatrix} 0 \\ v_{i_2}^2 \end{bmatrix}, \right. \quad (4)$$

$$\left. HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

where $e_1^N = [1, 0, \ldots, 0]^T \in C^N$. Letting $N_1$ denote the size of the vector codebook $\{v_i^1 \in C^M\}$, $N_2$ denote the size of the vector codebook $\{v_i^2 \in C^{M-1}\}$ and so on, the total number of M×M precoding matrices that can be generated is $N_1 \times N_2 \ldots \times N_{M-1}$. The rank-M precoding codebook can be any subset, i.e., can include some or all of the M×M matrices out of these $N_1 \times N_2 \ldots \times N_{M-1}$ possible M×M matrices.

A precoding matrix for rank-k can be formed by selecting any k columns of the possible M columns of the precoding matrix generated in accordance with Eq. 4. An exemplary rank-3 precoder matrix corresponding to the first three columns can be constructed from three vectors $v_i^1 \in C^M$, $v_j^2 \in C^{M-1}$, $v_k^3 \in C^{M-2}$ as follows:

$$A(v_i^1, v_j^2, v_k^3) = \quad (5)$$

$$\left[ v_i^1, HH(v_i^1 - e_1^M) \begin{bmatrix} 0 \\ v_j^2 \end{bmatrix}, HH(v_i^1 - e_1^M) \begin{bmatrix} 0 \\ HH(v_j^2 - e_1^{M-1}) \begin{bmatrix} 0 \\ v_k^3 \end{bmatrix} \end{bmatrix} \right].$$

The rank-k precoding codebook is a set of such M×k precoding matrices and the maximum possible size of the codebook is $N_1 \times N_2 \ldots \times N_{M-1}$. Note that a rank-k precoding codebook of smaller size can be obtained by selecting only a few of the M×M matrices and then picking any k columns out of each M×M matrix (the choice of the k column indices can also vary from one matrix to the other).

In an exemplary embodiment, only the set of vectors $\{v_i^1 \in C^M\}, \{v_i^2 \in C^{M-1}\}, \ldots, \{v_i^{M-1} \in C^2\}$ along with a set of complex scalars (described below) need be stored at the UE, thereby considerably lowering memory requirements at the UE, as compared to a scheme employing unstructured matrix codebooks. At the base station, where memory requirements are typically not as stringent, the matrix representation of the codebook can be stored. Moreover, it is not necessary for the UE to construct the matrix codewords to determine the optimal precoder matrix and the corresponding LMMSE filter for a given channel realization.

Precoder Selection

Figure 4:
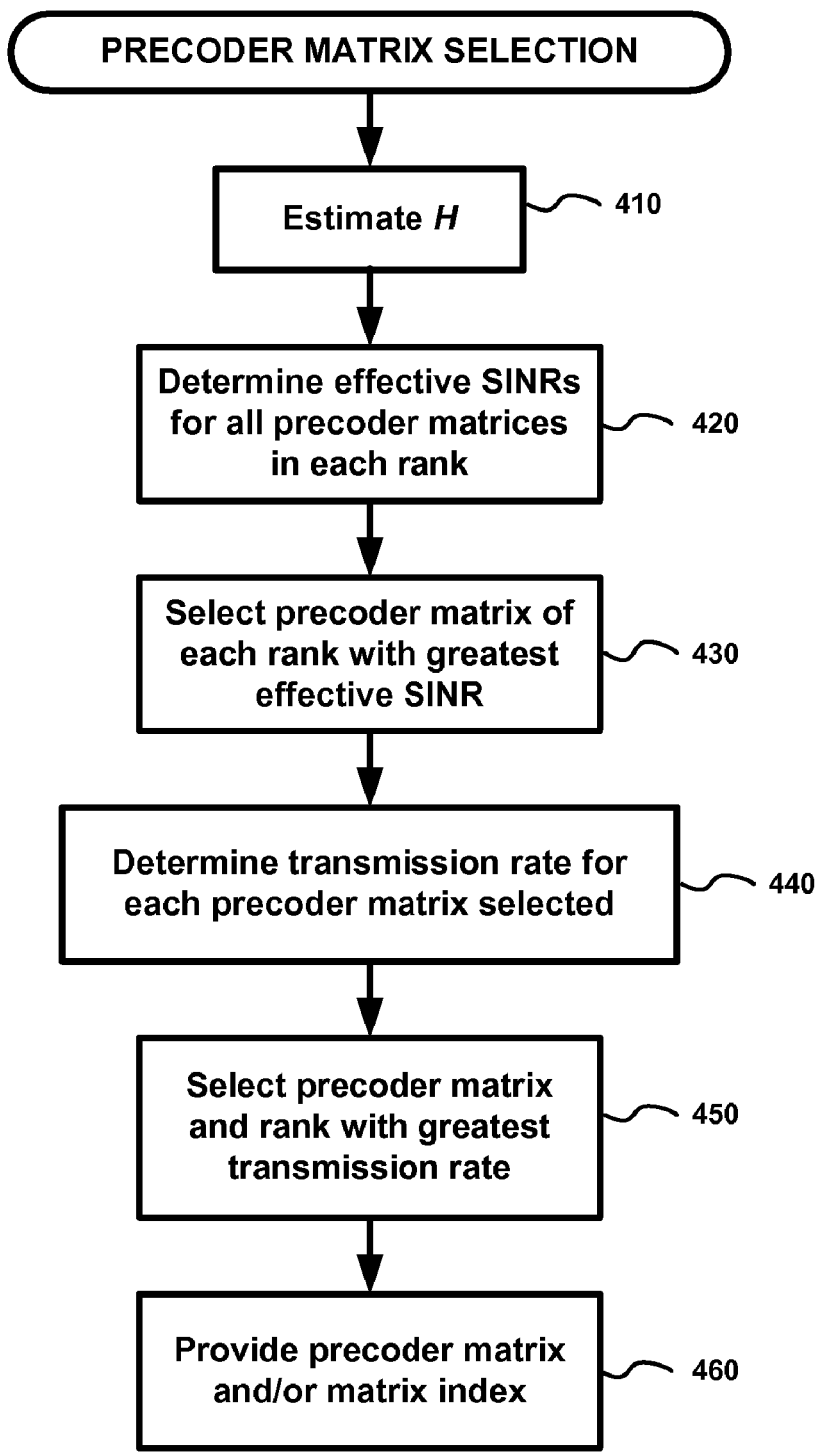
FIG. 4 is a flowchart of an exemplary embodiment of a method of selecting a precoder matrix in accordance with the present invention.

FIG. 4 is a flow chart providing an overview of an exemplary method of selecting the optimal precoder matrix in accordance with the present invention. Further details are set forth below. In an exemplary embodiment, the method shown is carried out at the UE, such as shown in FIG. 3.

As shown in FIG. 4, an estimate of the channel is made at 410, as described in greater detail below. At 420, based on the channel estimate H, an effective SINR is computed for each possible precoder matrix, in each beamforming rank. At 430, the computed effective SINRs are compared and for each rank, the precoder matrix with the greatest corresponding effective SINR is selected. At 440, the transmission rates that are anticipated by using the precoder matrices selected at 430 are determined. At 450, the anticipated transmission rates are compared, and the corresponding precoder matrix (and thus its rank) is selected for implementation. At 460, the selected precoder matrix, or a representation thereof, such as an index, is provided to the transmitter and to the receiver for implementation. The selected precoding rank is implicitly identified with the selected precoder matrix.

As mentioned above, in an exemplary embodiment, the precoder matrix selection takes place at the receiver (e.g., UE) and a representation (e.g., index) of the matrix selected is communicated to the transmitter (e.g., NodeB) via a feedback channel. It is also contemplated by the present invention, however, that this process may be carried out at the transmitter instead.

The various aspects of the method of FIG. 4 will now be described in greater detail.

SINR Computations

In computing SINR, the channel model estimate can be expressed as $H = [h_1, h_2, h_3, \ldots h_m]$, where m is the number of transmit antennas. For a precoded symbol stream p, where $p = 1, 2, \ldots k$, one can define:

$$H_{(p)} = [h_p, h_{p+1}, \ldots h_m]. \quad (6)$$

For a precoding matrix of rank k, denoted by $A(v_{i_1}^1, v_{i_2}^2, \ldots, v_{i_k}^k)$, a matrix $W_{i_1, \ldots, i_k}^{1,k}$ can be defined as follows:

$$W_{i_1, \ldots, i_k}^{1,k} = [S_{i_1, \ldots, i_k}^{1,k}]^* S_{i_1, \ldots, i_k}^{1,k}, \quad (7)$$

where $S_{i_1, \ldots, i_k}^{1,k} = HA(v_{i_1}^1, v_{i_2}^2, \ldots v_{i_k}^k)$ can be expanded as follows:

$$S_{i_1, \ldots, i_k}^{1,k} = \begin{bmatrix} Hv_{i_1}^1, H_{(2)}v_{i_2}^2 - 2\frac{\alpha_{i_1, i_2}^{1,2}}{\alpha_{i_1}^{(1)}}(Hv_{i_1}^1 - h_1), \ldots, \\ H_{(k)}v_{i_k}^k - 2\sum_{j=1}^{k-1}\frac{\alpha_{i_j, \ldots i_k}^{j,k}}{\alpha_{i_j}^{(j)}}(H_{(j)}v_{i_j}^j - h_j) \end{bmatrix}. \quad (8)$$

The SINR for the precoded stream p obtained with an LMMSE detector is given by:

$$SINR_p = \frac{\rho}{\left(\left(\frac{I}{\rho} + W_{i_1, \ldots, i_k}^{1,k}\right)^{-1}\right)_{p,p}} - 1, \quad (9)$$

where $\rho = P/N_0$, P is the average power per stream and $N_0$ is the noise variance. The effective SINR for the rank-k precoding matrix $A(v_{i_1}^1, v_{i_2}^2, \ldots, v_{i_k}^k)$ can be computed either as $$\exp\left(\sum_{p=1}^k \ln(1 + SINR_p)\right) - 1 \text{ or as } \sum_{p=1}^k \ln(1 + SINR_p).$$

The LMMSE filter is given by:

$$\left(\frac{I}{\rho} + W_{i_1, \ldots, i_k}^{1,k}\right)^{-1} [S_{i_1, \ldots, i_k}^{1,k}]^*. \quad (10)$$

In the case of an OFDM system, a narrow band channel model as in Eq. 1, can be assumed for each sub-carrier. Since the channel matrices are highly correlated among adjacent sub-carriers, the same precoder can be used in several consecutive sub-carriers. In this case, the SINRs and LMMSE filters can be determined for the channel seen on each sub-carrier using the above expressions. Moreover in this case, the effective SINR for the precoding matrix of rank k can be obtained using any one of the standard combining formulae. For instance, the effective SINR can be determined as:

$$\sum_{i \in \Omega} \sum_{p=1}^{k} \ln(1 + SINR_p^i)/|\Omega|, \quad (11)$$

where $SINR_p^i$ denotes the SINR computed for the stream p and subcarrier i using Eq. 9 and where $\Omega$ denotes the set of subcarriers using the same precoder.

Due to the nested structure of the codebook, the SINR computations and precoder selection are considerably simplified by avoiding redundant computations.

4×2 Embodiment

An exemplary embodiment of a system with a transmitter having four antennas (m=4), will now be described. In this embodiment, there are 16 possible precoder matrices per rank and the following vector codebooks are used:

$$\{v_i^1 \epsilon C^4\}_{i=1}^{4}, \{v_j^2 \epsilon C^3\}_{j=1}^{4}, [1,0]^T \epsilon C^2. \quad (12)$$

In the case of a UE with two receive antennas (n=2), transmission can occur in rank-1 or rank-2. The 16 possible precoder matrices for rank-2 are obtained as:

$$A(v_i^1, v_j^2) = \left[ v_i^1, HH(v_i^1 - e_1^4) \begin{bmatrix} 0 \\ v_j^2 \end{bmatrix} \right], 1 \le i, j \le 4. \quad (13)$$

The 16 possible precoder matrices for rank-1 are obtained as the second columns of all 16 possible matrices $\{A(v_i^1, v_j^2)\}$, respectively.

An exemplary CQI-metric based selection scheme will now be described. For simplicity, the receiver can be assumed to be an LMMSE receiver and the channel can be assumed to obey a flat fading model. In an OFDM system where the same precoder is used over several consecutive sub-carriers (referred to as a cluster), the following steps (with some straightforward modifications) are performed once for each sub-carrier in the cluster. To reduce complexity, however, a few representative sub-carriers from the cluster can be selected and the following steps performed once for each representative sub-carrier.

For a channel estimate matrix $H=[h_1, h_2, h_3, h_4]$ of size 2×4, the following matrices are determined:

$$HA(v_i^1, v_j^2) = [Hv_i^1, \tilde{H}v_j^2 - \alpha_{i,j}(Hv_i^1 - h_1)], \quad (14)$$

where $\tilde{H}=[h_2, h_3, h_4]$ and the complex scalars $\{\alpha_{i,j}\}_{i,j=1}^{4}$ are channel-independent factors that are pre-computed and stored at the UE. The optimal rank-1 precoding matrix can be determined as:

$$\arg\max_{i,j}\|\tilde{H}v_j^2 - \alpha_{i,j}(Hv_i^1 - h_1)\|^2. \quad (15)$$

The following matrices are then computed:

$$W^{i,j} = (HA(v_i^1, v_j^2))^* HA(v_i^1, v_j^2) \quad (16)$$

-continued
$$= \begin{bmatrix} \|Hv_i^1\|^2 & (Hv_i^1)^*(\tilde{H}v_j^2 - \alpha_{i,j}(Hv_i^1 - h_1)) \\ (\tilde{H}v_j^2 - \alpha_{i,j}(Hv_i^1 - h_1))^* Hv_i^1 & \|\tilde{H}v_j^2 - \alpha_{i,j}(Hv_i^1 - h_1)\|^2 \end{bmatrix}$$

and the optimal rank-2 precoding matrix is determined as:

$$\arg\min_{i,j} \left(\frac{I}{\rho} + W^{i,j}\right)^{-1}_{1,1} \left(\frac{I}{\rho} + W^{i,j}\right)^{-1}_{2,2}, \quad (17)$$

where $\rho=P/N_0$, P is the average power per stream and $N_0$ is the noise variance. Note that in the OFDM case, the optimal precoder for a cluster is determined using the corresponding effective SINRs which are obtained using the combining formula described above.

The MMSE filters are then determined for the optimal precoder as described above.

The effective SINRs for the precoders selected for rank-1 and rank-2 are determined as described above. A more detailed description for a 4×2 embodiment is found in the aforementioned U.S. Provisional Patent Application No. 60/888,193, which is incorporated herein by reference in its entirety.

In a further exemplary embodiment, there are 32 possible precoder matrices per rank and the following vector codebooks are used:

$$\{v_i^1 \epsilon C^4\}_{i=1}^{8}, \{v_j^2 \epsilon C^3\}_{j=1}^{4}, [1,0]^T \epsilon C^2. \quad (18)$$

Due to the nested structure of the codebook, significant complexity savings can be achieved by avoiding the redundant computations otherwise involved. The savings in computational complexity (e.g., number of multiplications) achieved by the present invention over other approaches, including other structured codebook approaches such as that described in "Codebook Design for E-UTRA MIMO Precoding," Document No. R1-062650, TSG-RAN WG1 Meeting #46bis, Seoul, South Korea, Oct. 9-13, 2006, can be quantified. In the case of 16 possible precoder matrices, for rank-2, the exemplary codebook implementation of the present invention results in L×118 fewer multiplications, where L is the number of representative sub-carriers used for precoder selection. For rank-1, there are L×64 fewer multiplications with the exemplary precoder scheme of the present invention. In the case of 32 possible precoder matrices, for rank-2, the exemplary codebook implementation of the present invention results in L×280 fewer multiplications, and for rank-1, L×168 fewer multiplications. The savings over unstructured codebook schemes are even greater.

Multi-Codeword Transmission

The exemplary transmitter and receiver described above with reference to FIGS. 2 and 3, respectively, can be readily extended for multi-codeword transmission. For q codeword transmission, where q can be at most m, the number of transmitting antennas, the $p^{th}$ codeword (where $1 \le p \le q$) is transmitted using $k_p$ streams along $k_p$ columns of the precoder matrix. The precoder rank is $$k = \sum_{p=1}^{q} k_p.$$

Furthermore, when the CQI for the $p^{th}$ codeword is below a threshold, $k_p=0$, so that the $p^{th}$ codeword is not transmitted.

For an m×k precoder matrix Q of rank k, a mapping rule decides the split $k \to (k_1, \ldots, k_q)$ as well as the column indices of Q that the $k_p$ streams of the $p^{th}$ codeword, where $1 \leq p \leq q$, should be sent along. For a given precoder matrix, split and choice of column indices, the SINRs for each codeword can be computed using the formulae given above (with simple modifications). Then, for a given precoder matrix, the optimal split and choice of column indices is the one which maximizes the anticipated transmission rate, which itself can be determined from the computed SINRs. Finally, the optimal precoder matrix is the one which along with its optimal split and choice of column indices, yields the highest anticipated transmission rate.

Figure 5:
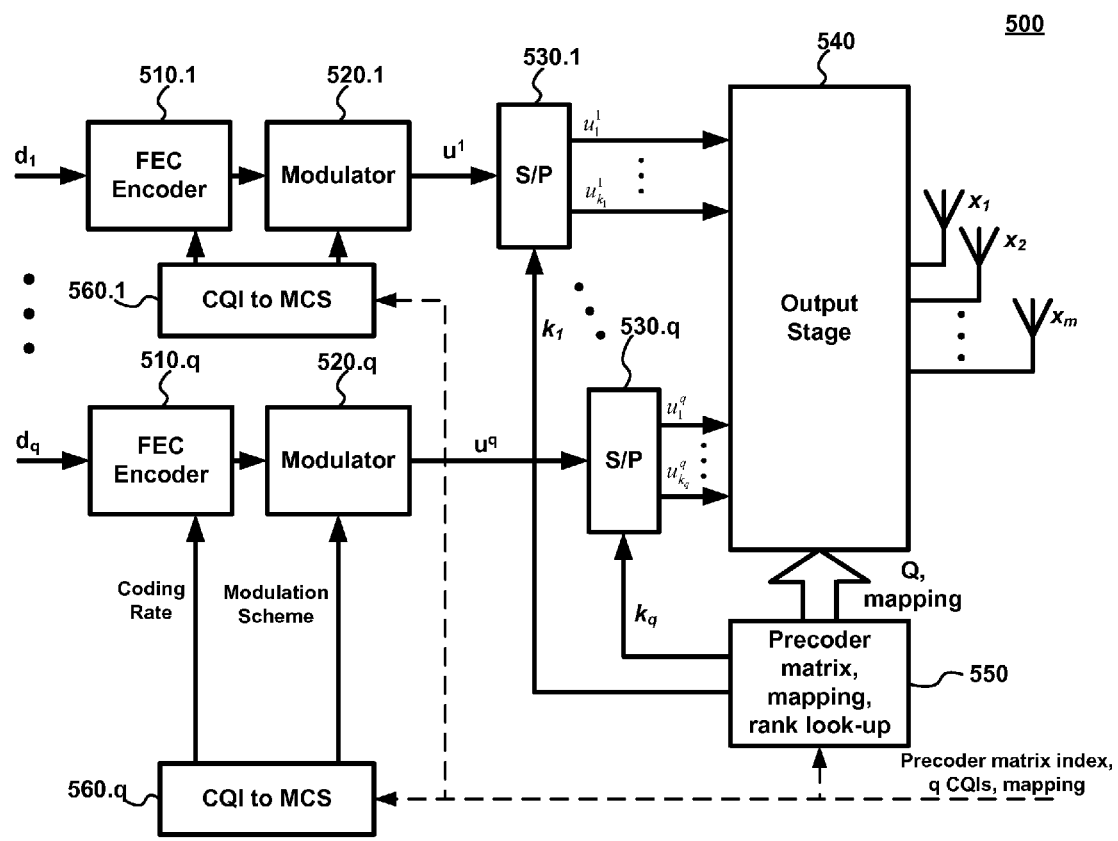
FIG. 5 is a block diagram of an exemplary embodiment of a multi-codeword transmitter in accordance with the present invention.

FIG. 5 shows a block diagram of an exemplary embodiment of a q codeword transmitter 500 based on the architecture of the transmitter 200 shown in FIG. 2. As shown in FIG. 5, each of the q data streams is FEC encoded and modulated independently. Moreover, a CQI for each of the q data streams as well as mapping data are fed-back from the receiver.

Figure 6:
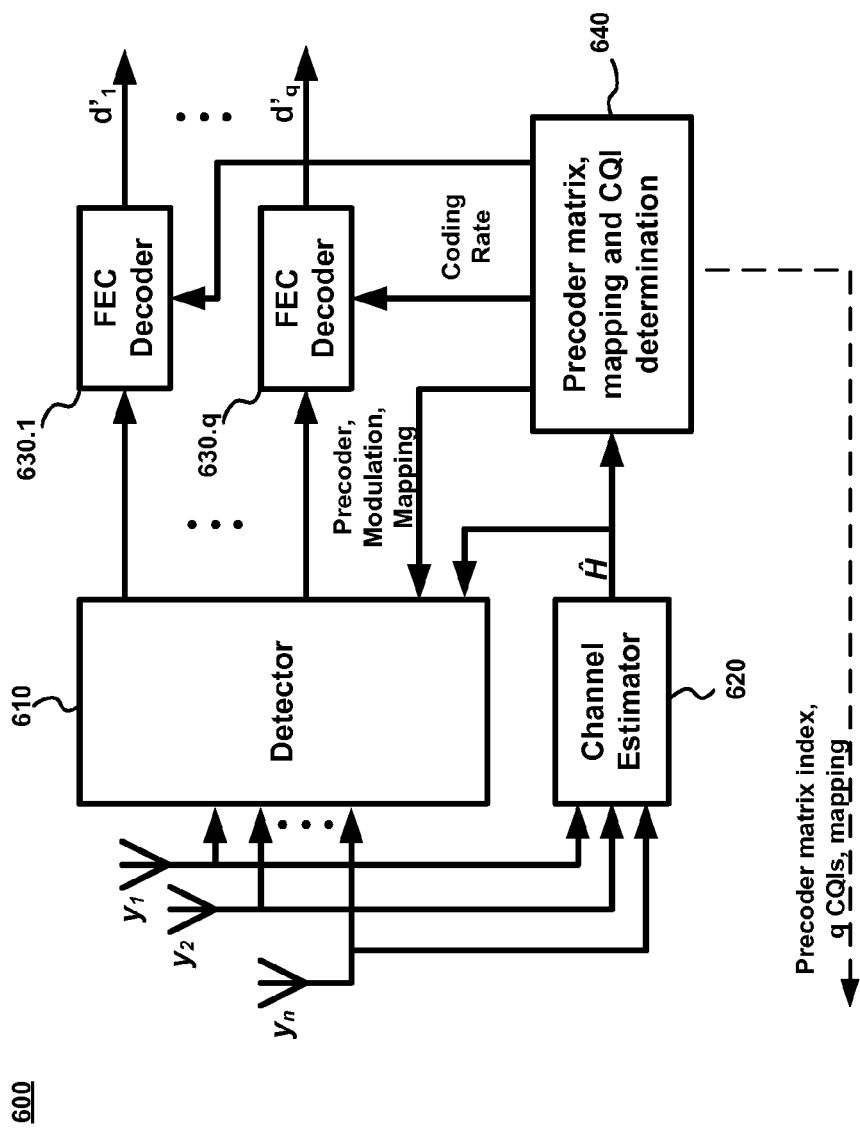
FIG. 6 is a block diagram of an exemplary embodiment of a multi-codeword linear receiver in accordance with the present invention.

FIG. 6 shows a block diagram of an exemplary embodiment of a q codeword linear receiver 600 based on the architecture of the receiver 300 shown in FIG. 3. The receiver 600 can operate with the transmitter 500 of FIG. 5. In this embodiment, the q codewords are demodulated and then FEC decoded independently.

Figure 7:
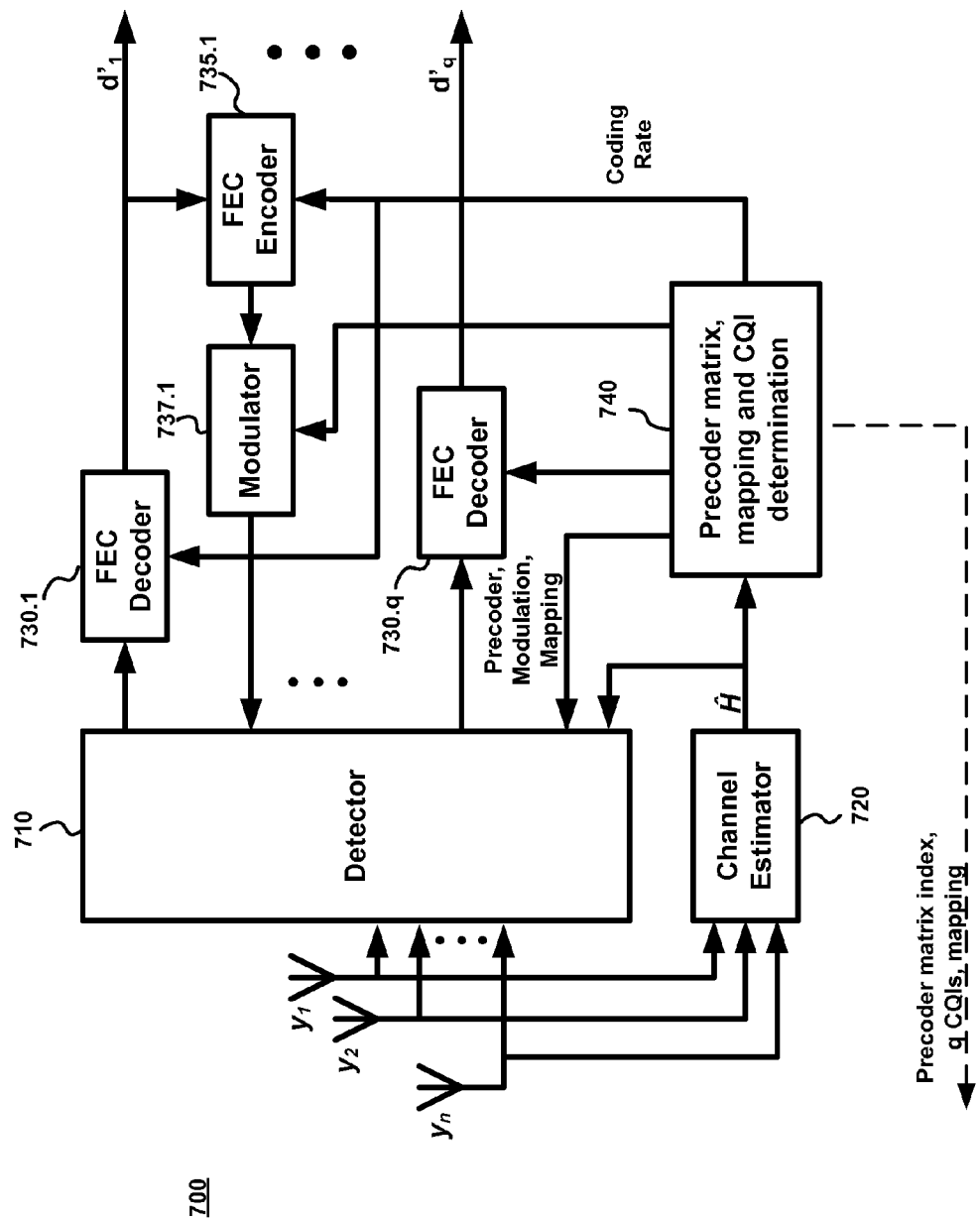
FIG. 7 is a block diagram of an exemplary embodiment of a multi-codeword successive interference canceling receiver in accordance with the present invention.

FIG. 7 shows a block diagram of an exemplary embodiment of a q codeword receiver 700 incorporating successive intereference cancellation (SIC). In this embodiment, each of q−1 recovered data streams, corresponding to codewords 1 through q−1, is re-encoded by a FEC encoder 735 and re-modulated by a modulator 737, and then fed-back to the detector 710.

The mapping information fed back from the receiver includes the split and the choice of column indices. The mapping rule can also be fixed, or varied slowly ("semi-static"). In this case, each m×k precoder matrix Q is associated with one split $(k_1, \ldots, k_q)$ and one choice of column indices. With a fixed or semi-static mapping rule, the receiver need not feed-back mapping information to the transmitter because it can be inferred by the transmitter based on just the precoder matrix index that is fed-back.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of operating a multi-rank beam forming (MRBF) system comprising:
   modulating a data signal to generate a modulated symbol;
   precoding the modulated symbol using a precoding matrix selected from a plurality of matrices; and
   transmitting the precoded modulated symbol using at least two transmit antennas,
   wherein the plurality of matrices have a nested structure and are derived from a set of vector codebooks determined in accordance with the following expression:

$$A(v_{i_1}^1, v_{i_2}^2, v_{i_3}^3, \ldots) = \left[ v_{i_1}^1, HH(v_{i_1}^1 - e_1^M) \begin{bmatrix} 0 \\ v_{i_2}^2 \end{bmatrix}, \right.$$

$$\left. HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

wherein $e_1^N = [1, 0, \ldots, 0]^T \in C^N$, M is the number of transmit antennas, $C^N$ is an N-dimensional complex space, $$HH(w) = \begin{cases} I - 2\frac{ww^H}{\|w\|^2} & \text{if } w \neq 0 \\ I & \text{if } w = 0 \end{cases} \text{ and } \{v_{i_j}^j \in C^{M-j+1}\}$$

is a vector codebook and $v_i^a$ is selected from a set $V^a$ where $V^1 = \{v_i^1 \in C^M\}_{i=1}^{N_1}$, $V^2 = \{e_1^{M-1}\}$, $V^3 = \{e_1^{M-2}\}, \ldots$.

2. The method of claim 1, wherein deriving the precoding matrix of rank-k comprises;
   generating a square matrix using the expression in claim 1; and
   picking k columns of the square matrix.

3. The method of claim 1, further comprising:
   estimating a channel over which the precoded modulated symbol is to be transmitted;
   determining a channel quality metric for each of the plurality of matrices; and
   selecting one of the matrices according to the channel quality metric.

4. The method of claim 3 wherein determining the channel quality metric for each of the plurality of matrices exploits the nested structure of said matrices.

5. The method of claim 4, wherein exploiting the nested structure of a first matrix involves reusing a computation made in determining the channel quality metric of a second matrix which is a sub-matrix of the first matrix.

6. The method of claim 1, wherein a scaled version of the precoding matrix is used.

7. The method of claim 1, wherein the number of transmit antennas is 4.

8. The method of claim 1, wherein the number of transmit antennas is 2.

9. The method of claim 2, wherein the number of selected columns to form the precoding matrix is less than the number of transmit antennas.

10. The method of claim 2, wherein all the columns are selected to form the precoding matrix.

* * * * *